US012443692B2

(12) United States Patent
Allen

(10) Patent No.: US 12,443,692 B2
(45) Date of Patent: Oct. 14, 2025

(54) VERIFICATION OF ACCESS TO SECURED ELECTRONIC RESOURCES

(71) Applicant: EQUIFAX INC., Atlanta, GA (US)

(72) Inventor: Kenneth Allen, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 18/364,926

(22) Filed: Aug. 3, 2023

(65) Prior Publication Data

US 2023/0376585 A1    Nov. 23, 2023

Related U.S. Application Data

(63) Continuation of application No. 16/954,959, filed as application No. PCT/US2019/015962 on Jan. 31, 2019, now Pat. No. 11,762,975.

(60) Provisional application No. 62/624,985, filed on Feb. 1, 2018.

(51) Int. Cl.
*H04L 29/06* (2006.01)
*G06F 21/31* (2013.01)
*G06F 21/44* (2013.01)
*G06N 5/01* (2023.01)

(52) U.S. Cl.
CPC .............. *G06F 21/44* (2013.01); *G06F 21/31* (2013.01); *G06N 5/013* (2023.01); *G06F 2221/2103* (2013.01); *G06F 2221/2141* (2013.01)

(58) Field of Classification Search
CPC ........... G06F 21/31; G06F 21/45; G06F 21/62
See application file for complete search history.

(56) References Cited

U.S. PATENT DOCUMENTS

| | | | |
|---|---|---|---|
| 9,801,066 | B1 | 10/2017 | Hanley et al. |
| 11,762,975 | B2 | 9/2023 | Allen |
| 2005/0193211 | A1 | 9/2005 | Kurose |
| 2007/0266257 | A1* | 11/2007 | Camaisa ............. H04L 63/1483 713/182 |

(Continued)

FOREIGN PATENT DOCUMENTS

CA    3059330 A1    12/2018

OTHER PUBLICATIONS

U.S. Appl. No. 16/954,959, Advisory Action, Mailed On Oct. 12, 2022, 5 pages.

(Continued)

*Primary Examiner* — Jason K Gee
(74) *Attorney, Agent, or Firm* — Kilpatrick Townsend & Stockton LLP

(57) ABSTRACT

Aspects and examples are disclosed for improving multi-factor authentication techniques to control access to secured electronic resources. In one example, a decisioning computer system evaluates, based on a passive-dimension decision process, an access request, received from a user device, for a secured electronic resource. The passive-dimension decision process can evaluate dimensions associated with the access request, such as identity or device characteristics, to determine whether the dimensions of the access request are outside of norms for the user. Based on the passive-dimension decision model, the decisioning computing device may communicate to the user device an access decision, the access decision describing one or more of an access authorization, a denial of access, or a supplemental authentication challenge.

20 Claims, 3 Drawing Sheets

(56) References Cited

U.S. PATENT DOCUMENTS

| | | | |
|---|---|---|---|
| 2011/0276563 A1* | 11/2011 | Sandoval | H04L 63/102 707/723 |
| 2012/0110646 A1 | 5/2012 | Ajitomi et al. | |
| 2014/0366111 A1* | 12/2014 | Sheller | G06F 21/316 726/7 |
| 2015/0089568 A1 | 3/2015 | Sprague et al. | |
| 2015/0278504 A1 | 10/2015 | Azim et al. | |
| 2015/0365423 A1 | 12/2015 | Prokopi et al. | |
| 2016/0055326 A1 | 2/2016 | Votaw et al. | |
| 2016/0087957 A1 | 3/2016 | Shah et al. | |
| 2017/0034183 A1 | 2/2017 | Enqvist et al. | |
| 2017/0085587 A1* | 3/2017 | Turgeman | G06F 3/0489 |
| 2017/0230379 A1 | 8/2017 | Morelli, Jr. | |
| 2018/0034859 A1 | 2/2018 | Aronowitz et al. | |

OTHER PUBLICATIONS

U.S. Appl. No. 16/954,959, Final Office Action, Mailed On Jul. 29, 2022, 12 pages.

U.S. Appl. No. 16/954,959, Non-Final Office Action, Mailed On Apr. 6, 2022, 13 pages.

U.S. Appl. No. 16/954,959, Non-Final Office Action, Mailed On Jan. 26, 2023, 14 pages.

U.S. Appl. No. 16/954,959, Notice of Allowance, Mailed On May 8, 2023, 8 pages.

Australian Application No. AU2019214998, "First Examination Report", May 24, 2023, 3 pages.

European Application No. EP19746845.7, Extended European Search Report, Mailed On Sep. 15, 2021, 11 pages.

International Application No. PCT/US2019/015962, International Preliminary Report on Patentability, Mailed On Aug. 13, 2020, 8 pages.

International Application No. PCT/US2019/015962, International Search Report and Written Opinion, Mailed On May 15, 2019, 11 pages.

Canadian Application No. 3,089,255, Office Action mailed on Jan. 3, 2024, 8 pages.

Australian Application No. 2019239311, Second Examination Report mailed on Feb. 26, 2024, 3 pages.

European Application No. 19746845.7, Office Action mailed on Jul. 26, 2023, 7 pages.

Canadian Application No. CA3,089,255 , Office Action, Mailed On Nov. 5, 2024, 6 pages.

European Application No. EP19746845.7, Office Action, Mailed On Jun. 26, 2025, 7 pages.

\* cited by examiner

VERIFICATION OF ACCESS TO SECURED ELECTRONIC RESOURCES

CROSS-REFERENCE TO RELATED APPLICATIONS

This application is a continuation of U.S. Ser. No. 16/954,959, filed Jun. 17, 2020, and titled "Verification of Access to Secured Electronic Resources," which is a U.S. National Phase of International Application No. PCT/US2019/015962, filed Jan. 31, 2019, and titled "Verification of Access to Secured Electronic Resources," which claims priority to U.S. Provisional Application Ser. No. 62/624,985 filed Feb. 1, 2018, and titled "Verification of Access to Secured Electronic Resources," the entire contents of which are all hereby incorporated by reference.

TECHNICAL FIELD

This disclosure relates generally to computer and electronic security and techniques for preventing unauthorized access to electronic resources by verifying the authentication of users and denying access or requesting supplemental authentication when authentication verification fails or is otherwise flagged for needing confirmation.

BACKGROUND

Access restrictions may be placed on electronic resources in order to restrict access by unauthorized users. Primary authentication is typically required. Some systems employ a multi-factor authentication technique as a way to prevent unauthorized access to a secured electronic resource. To access the secured electronic resource, an end user provides multiple authentication factors, such as a combination of any of login information, a one-time password, biometric data, a keycard or other physical object, or other suitable authentication techniques. In conventional techniques for multi-factor authentication, the user may provide the multiple factors for each access to the secured electronic resource. But continually or periodically satisfying a multi-factor authentication may be burdensome on users. A user who is frustrated by having to constantly provide multiple factors may disengage or otherwise circumvent the multi-factor authentication technique, reducing the security of the electronic resource. Prior solutions for using multi-factor authentication to restrict access to electronic resources may therefore fail to adequately restrict access to secured electronic resources.

SUMMARY

Aspects and examples are disclosed for controlling access to a secured electronic resource by applying a passive-dimension decision model to determine an authentication challenge level. In one example, a decisioning computing device including one or more processors receives a verification request to access a secured electronic resource. The request may be received from a user device, such as (but not limited to) a laptop or personal mobile device. The decisioning computing device may determine an authentication challenge level for the user device by applying a passive-dimension decision model to the user device, the request, or both. The passive-dimension decision model may include analyzing one or more identity characteristics or device characteristics of the user device, of the request, or of both. The decisioning computing device may communicate, to the user device, an access decision that is based on the authentication challenge level. In some cases, the access decision may include data describing one or more of an authorization to access the secured electronic resource, a denial of access to the secured electronic resource, or a supplemental authentication challenge to the user device.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF FIGURES

These and other features, aspects, and advantages of the present disclosure are better understood when the following Detailed Description is read with reference to the accompanying drawings, wherein.

DETAILED DESCRIPTION

Figure 1:
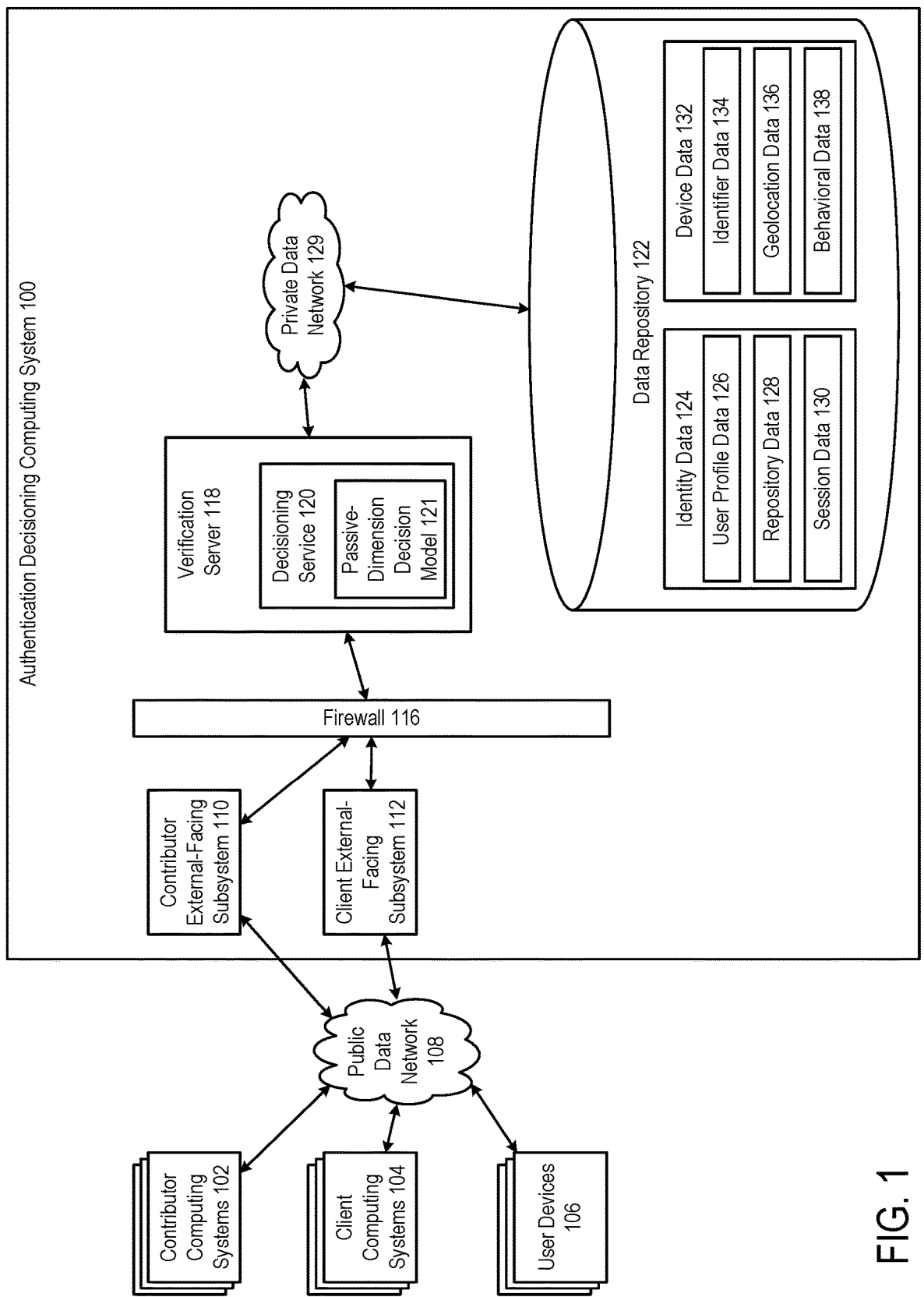
FIG. 1 is a block diagram depicting an example of an operating environment in which an authentication decisioning computing system handles queries for determining whether to present user devices with supplemental authentication queries, according to an aspect of the present disclosure.

As described herein, certain aspects provide improvements to applications that control access to secured electronic resources. In some cases, the described improvements solve authentication problems that are specific to online platforms, such as an authentication decisioning computing system that receives an access request, transmitted via one or more communication networks, from a remote user device. For example, an authentication decisioning computing system may control access to one or more secured electronic resources. To access the secured electronic resource, a user must often validate his or her identity, such as by submitting multiple authentication factors. An existing access-control system that uses multi-factor authentication may require the multiple factors for each request to access the secured electronic resource. However, the user may become frustrated by having to provide the multiple factors with each request, and disengage or attempt to circumvent the multi-factor authentication, thus reducing the security of the existing access-control system. In addition, the existing access-control system may require the multiple factors periodically, such as once per 24-hour period. However, a sophisticated attacker may leverage periodic requirements, such as by timing attacks to accommodate a user's pattern of requests.

This disclosure describes aspects and examples that improve multi-factor authentication techniques by evaluating, based on a passive-dimension decision process, an attempt to access a secured electronic resource by a user or user device. The passive-dimension decision process can allow a decisioning computing system to determine whether the user or user device is authorized to access the secured electronic resource. The passive-dimension decision process can evaluate identity or device characteristics (i.e., dimensions) to determine whether the characteristics are outside of norms for the user (e.g., due to fraudulent access attempts or access attempts exceeding a scope of authorization). In some aspects, such a passive evaluation may take place after primary authentication of the user or user device by a username and password combination or other authentication token. In this way, the techniques described herein can be used to verify whether access to secured electronic resources is authorized, and can be used to take supplemental action, when needed.

In some aspects, a passive-dimension decision process involves a process by which an authentication challenge level can be determined solely using characteristics that are independent of information provided by a user for purposes of primary authentication. Instead, the passive-dimension decision process uses information that is passively obtained and analyzed—that is without the user or user device intentionally providing the information or otherwise interactively participating during the analysis—to determine whether an attempt to access secured electronic resources is authorized or not authorized and establish an appropriate authentication challenge level. The authentication challenge level can represent or be used to determine whether to authenticate or not authenticate the user to access the secured electronic resources. For example, in some aspects, information may be obtained by the passive-dimension decision process relating to identity characteristics, device characteristics, or both, such as obtained from a database or a remote server, and used to evaluate characteristics of an attempt or request to access the secured electronic resource. Optionally, such information may be obtained and analyzed in real-time to verify the authentication of the user. By doing so, the passive-dimension decision process can improve computer security and access to secured electronic resources by making it easier, faster, and more seamless for authorized users to obtain access while also hardening a secured electronic resource against unauthorized access.

The passive-dimension decision process can provide a simplified authorization approach that minimizes burdens on legitimate users. If access attempts are verified (i.e., determined to be legitimate or authorized), the requesting user device may be allowed access to the secured electronic resources. Access attempts that are determined to not be legitimate or are unauthorized may be subjected to additional scrutiny, such as requiring supplemental authentication. Examples of additional scrutiny include challenging the user to a two-factor authentication scheme before access to the secured electronic resource is authorized. In some instances, access attempts that are determined to be illegitimate or not authorized may be denied access to the secured electronic resources and may even not trigger presentation of a supplemental authentication challenge, depending on an authentication challenge level determined using the passive-dimension decision process.

The disclosed techniques can simplify access to any electronic resource. Non-limiting examples of secured electronic resources that may benefit from the disclosed techniques include secured file systems, human resource databases, financial databases, payroll databases, digital account databases, electronic payment platforms, email systems, social network systems, etc. The passive evaluation may be provided via a decisioning computing system that can be used by various external computing systems to verify authentication for users of each of the external computing systems. Optionally, passive evaluation may be provided via a standalone decisioning computing system that can be used by for authentication verification of a single system.

Operating Environment for Authentication Decisioning Computing System

Referring now to the drawings, FIG. 1 is a block diagram depicting an example of an operating environment in which an authentication decisioning computing system handles queries for determining whether to present user devices with supplemental authentication queries. FIG. 1 depicts examples of hardware components of an authentication decisioning computing system 100, according to some aspects. The authentication decisioning computing system 100 is a specialized computing system that may be used for processing large amounts of data using a large number of computer processing cycles.

The numbers of devices depicted in FIG. 1 are provided for illustrative purposes. Different numbers of devices may be used. For example, while certain devices or systems are shown as single devices in FIG. 1, multiple devices may instead be used to implement these devices or systems.

The authentication decisioning computing system 100 can communicate with various other computing systems, such as contributor computing systems 102 and client computing systems 104. For example, contributor computing systems 102 and client computing systems 104 may send data to the verification server 118 that control or otherwise influence different aspects of the authentication decisioning computing system 100 or the data it is processing. The client computing systems 104 may also interact with user devices 106 via one or more public data networks 108, such as the Internet, to facilitate authentication of users of user devices 106 for access to secured electronic resources provided by client computing systems 104. It will be appreciated that, in some embodiments, authentication decisioning computing system 100 may be separate from a client computing system 104 or may be integrated into a client computing system 104. A user can use a user device 106, such as a personal computer, laptop, tablet, smartphone, and the like, to access an online service, such as a secured electronic resource, hosted by a client computing system 104. For example, a request for access to a secured electronic resource of the client computing system 104 can be generated by the user device 106. Such a request may correspond to a query for information, a service, or a transaction that is secured, such as by one or more login credentials.

The contributor computing systems 102 and client computing systems 104 may interact, via one or more public data networks 108, such as the Internet, with various external-facing subsystems of the authentication decisioning computing system 100. For example, the authentication decisioning computing system 100 can include a contributor external-facing subsystem 110 and a client external-facing subsystem 112. Each external-facing subsystem may include one or more computing devices that provide a physical or logical subnetwork (sometimes referred to as a "demilitarized zone" or a "perimeter network") that expose certain online functions of the authentication decisioning computing system 100 to an untrusted network, such as the Internet or public data network 108. In some aspects, these external-facing subsystems can be implemented as edge nodes, which provide an interface between the public data network 108 and a cluster computing system, such as a Hadoop cluster used by the authentication decisioning computing system 100.

Each external-facing subsystem is communicatively coupled, optionally via a firewall device 116, to one or more computing devices forming a private data network 129. The firewall device 116, which can include one or more devices, creates a secured part of the authentication decisioning computing system 100 that includes various devices in communication via the private data network 129. In some aspects, by using the private data network 129, the authentication decisioning computing system 100 can house a data repository 122 or database in an isolated network (i.e., the private data network 129) that has no direct accessibility via the Internet or public data network 108.

Each contributor computing system 102 may include one or more third-party devices (e.g., computing devices or groups of computing devices), such as individual servers or groups of servers operating in a distributed manner. A contributor computing system 102 can include any computing device or group of computing devices operated by one or more data sources or data providers, such as an employer, a payroll system, a human-resource management system, an insurance provider system, a healthcare provider system, an online merchant, a social network system, an e-commerce system, a payments processor system, a public data repository system, a government data-provider system, etc. The contributor computing system 102 can include one or more server devices. The one or more server devices can include or can otherwise access one or more non-transitory computer-readable media. The contributor computing system 102 can also execute an online service. The online service can include executable instructions stored in one or more non-transitory computer readable media. The contributor system 102 can further include one or more processing devices that are capable of storing, formatting, and transmitting data, such as identity-related data, transaction-related data, or device-related data to authentication decisioning computing system 100. In some aspects, contributor computing system 102 can provide data that is incorporated into data repository 122 and used by decisioning service 120 in a passive-dimension decision process 121. The passive-dimension decision process 121 can include or otherwise implement a passive-dimension decision model.

Each client computing system 104 may include one or more third-party devices, such as individual servers or groups of servers operating in a distributed manner. A client computing system 104 can include any computing device or group of computing devices operated by a provider of products or services. Optionally, client computing system 104 can correspond to an authentication decisioning computing system 100 that directly faces user devices 106. The client computing system 104 can include one or more server devices. The one or more server devices can include or can otherwise access one or more non-transitory computer-readable media. The client computing system 104 can also execute online service. The online service can include executable instructions stored in one or more non-transitory computer-readable media. The client computing system 104 can further include one or more processing devices that are capable of executing the online service to perform operations described herein. In some aspects, the online service can provide an interface (e.g., a website, web server, or other server) to facilitate access to secured electronic resources by a user of a user device 106. The online service may transmit data to and receive data from the user device 106 to enable access to secured electronic resources.

A user device 106 can include any computing device or other communication device operated by a user, a consumer, or a buyer, for example. The user device 106 can include one or more user devices 106. A user device 106 can include executable instructions stored in one or more non-transitory computer-readable media. The user device 106 can also include one or more processing devices that are capable of executing instructions to perform operations described herein. In some aspects, user device 106 can allow a user to access a secured electronic resource of a client computing system 104.

Each communication within the authentication decisioning computing system 100 may occur over one or more data networks, such as a public data network 108, a private data network 129, or some combination thereof. A data network may include one or more of a variety of different types of networks, including a wireless network, a wired network, or a combination of wired and wireless networks. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like to connect devices in the data network.

A data network may include network computers, sensors, databases, or other devices that may transmit or otherwise provide data to authentication decisioning computing system 100. For example, a data network may include local area network devices, such as routers, hubs, switches, client devices, or other computer network devices. The data networks depicted in FIG. 1 can be incorporated entirely within (or can include) an intranet, an extranet, or a combination thereof. In one example, communications between two or more systems or devices can be achieved by a secure communications protocol, such as secure hypertext transfer protocol ("HTTPS") communications that use secure sockets layer ("SSL") or transport layer security ("TLS"). In addition, data or secured electronic resource details communicated among the various computing devices may be encrypted. For example, data may be encrypted in transit and at rest.

The authentication decisioning computing system 100 can include one or more verification servers 118. The verification server 118 may be a specialized computer or process or other machine that processes data received within authentication decisioning computing system 100. The verification server 118 may include a database system for accessing network-attached storage units or a communications grid, such as a grid-based computing system for processing large amounts of data.

In some aspects, verification server 118 can use data obtained from contributor computing systems 102 to facilitate the real-time provisioning of authentication decisioning information, such as indicators that a user of a user device 106 may not be authorized, to client computing systems 104 that provide services including access to secured electronic resources. This provision of information facilitates real-time decisioning during access or attempted access to secured electronic resources between the client computing system 104 and a user device 106. In some aspects, real-time operation of a decision process can involve analyzing obtained data and performing a verification of a user's authentication (or other decision using the passive-dimension decision process) during a particular time period. The particular time period can begin at or after the start of an online session between a decisioning computing system and a computing device that is associated with the user and remote from the decisioning computing system. The particular time period can end at or before the end of the online session. The authentication decisioning computing system 100 can communicate with client computing systems 104 in a manner that is out of band with respect to one or more of the contributor computing systems 102, other client computing systems 104, and user devices. For example, the communications between the authentication decisioning computing system 100 and a contributor computing system 102 can be performed via a separate communication channel, session, or both as compared to a communication channel or session established between authentication decisioning computing system 100 and a client computing system 104 or a user device 106.

The authentication decisioning computing system 100 can include one or more processing devices that execute program code or processor performable instructions, such as decisioning service 120. The program code or instructions may be stored on a non-transitory computer-readable medium. Decisioning service 120 may execute one or more processes for applying rule-based data analytics that identify whether or not a user device 106 is or should be approved to access secured electronic resources, whether or not a user device 106 is to be presented with a supplemental authentication challenge before access to the secured electronic resources is approved, or both.

For instance, such a decision may occur where a user device 106 requests or otherwise attempts to access a secured electronic resource of a client computing system 104. Examples include attempts to access a payroll database, attempts to conduct an electronic transaction, attempts to access a secured file system, attempts to modify account profile characteristics, etc. The user device 106 may obtain primary authorization credentials, such as username and password, access cookies, security cookies, security tokens, and the like. The authorization credentials can be verified by computing system 104 to allow access to the secured electronic resource. However, prior to permitting access to the secured electronic resource, the computing system 104 may institute a query to authentication decisioning computing system 100 to verify whether access to the secured electronic resource should be permitted or denied. Such an analysis of whether access to the secured electronic resource may be performed by verification server 118 based on analysis of passive-dimension characteristics according to a passive-dimension decision process 121.

Depending on the nature of the query from the user device 106, different information may be evaluated by passive-dimension decision process 121. For example, data from a data repository 122 may be passively analyzed without input or interaction from a user of the user device 106. Examples of data useful for passively evaluating whether or not to permit access to a secured electronic resource include identity data 124 and device data 132. In some aspects, data from one or more contributor computing systems 102 may be used in the passive evaluation according to passive-dimension decision process 121 by decisioning service 120. In some aspects, user device 106 may provide session data for use in passive-dimension decision process 121. Examples of session data include data input into response to one or more informational queries presented at user device 106, data relating to a hardware environment of user device, or data relating to an operating or software environment of user device data. In some aspects, session data may include information associated with a transaction, such as changes to characteristics associated with a user account, a purchase or financial transaction, an electronic file request, etc., and such transaction information may optionally be compared with historical transaction information as part of passive-dimension decision process 121.

In some aspects, the decisioning service 120 can include one or more modules, such as a web server module, a web services module, or an enterprise services module, which individually or in combination facilitate authorizing access to secured electronic resources. For example, a web server module can be executed by a suitable processing device to provide one or more web pages or other interfaces to a contributor computing system 102, a client computing system 104, or, optionally, a user device 106. The web pages or other interfaces can include content provided by the web services module. One or more of the web services module and enterprise services modules can be executed to resolve a query for verification of access to a secured electronic resources.

The authentication decisioning computing system 100 may also include one or more storage units, such as a network-attached storage unit, on which various repositories, databases or other data structures may be stored. An examples of such a data structure includes data repository 122. Storage units may store a variety of different types of data organized in a variety of different ways and from a variety of different sources. For example, a storage unit may include storage other than a primary storage located within verification server 118 that is directly accessible by processors located therein. In some aspects, the storage unit may include secondary, tertiary, or auxiliary storage, such as large hard drives, flash memory, servers, virtual memory, among other types. Storage devices may include portable or non-portable storage devices, optical storage devices, network storage devices, and various other mediums capable of storing and containing data. A machine readable storage medium or computer-readable storage medium may include a non-transitory medium in which data can be stored, such as on a permanent or semi-permanent basis, and that does not include carrier waves or transitory electronic signals. Examples of a non-transitory medium may include, for example, a magnetic disk or tape, optical storage medium such as compact disc or digital versatile disc, flash memory, or other memory devices.

For example, the data repository 122 can store identity data 124, device data 132, or both. In some aspects, identity data 124 and device data 132 may correspond to individual identity databases and device databases of authentication decisioning computing system 100. The identity data 124 can be analyzed by verification server 118 to determine, for example, whether or not to present a supplemental authorization challenge to a user device. The identity data 124 and device data 132 can optionally correspond to one or more of data received by verification server 118 from contributor systems 102, data generated by the verification server 118, or data from a user device 106. The identity data 124 and device data 132 can be stored in, for example, secure and credentialed databases or other data structures managed by or otherwise accessible by the decisioning service 120. Data repository 122 may include identity data 124 and device data 132 and any data sub-components thereof and any other data as a relational database, allowing cross-referencing between data entries.

The identity data 124, for example, may correspond to information useful for or related to determining whether a user's identity is authentic and may be used to uniquely identify a user. For example, user identity data 124 may include user profile data 126, which may relate to one or a plurality of different users. In some aspects, user profile data 126 can include information, such as personally identifiable information, that can be used on its own to identify a user. Non-limiting examples of such user profile data 126 include a legal name, a company name, a social insurance number, a credit card number, a date of birth, a username, a telephone number, an email address, a work address, a home address, a biometric identifier, etc. In some embodiments, user profile data 126 can include information that can be used in combination with other information to identify a user. Other non-limiting examples of such user profile data 126 include a street address, zip code, or other geographical location information, employment data, a telephone number, an email address, a date of birth, a credit card number, etc.

Identity data 124 may optionally include historical usage information relating to user profile data 126, such as a frequency of access to user profile data 126 by decisioning service 120 for verifying authentication of users. Such usage information may include times of day for access by user devices 106 to secured electronic resources of client computing systems 104, durations of access to secured electronic resources, or any other information tending to show usage patterns of access to secured electronic resources by users. Such usage patterns may be informative to decisioning service 120 in performing passive-dimension decision process 121 to determine whether to deny access to the secured electronic resource or to permit access to the secured electronic resource, with or without supplemental authentication. As an example, passive-dimension decision process 121 may determine that a user has historically accessed a particular secured electronic resource at a particular time of day, on a particular day of week, etc., and determine that a request for access to the particular secured electronic resource that falls outside of the historical usage pattern may be denied or may require supplemental authentication before the user is permitted access.

Identity data 124 may optionally include repository data 128, which may correspond, for example, to characteristics or rules describing a historical perspective of a user or identity elements for a user in circumstance in which these elements may appear. For example, repository data 128 may include information cross-referencing particular user profile data 126 with multiple user accounts. As a specific example, repository data 128 may relate to information about how many different user accounts are or have been associated with a particular email address. Alternatively or additionally, repository data 128 may relate to information about how many different email addresses are or have been associated with a particular user account and a frequency with which the email addresses are added or changed. As another example, repository data 128 may characterize a number, type, frequency, etc. of transactions involving a particular user. Repository data 128 may, for example, be useful for providing insights into user behavior that may be useful in evaluating whether a particular user account or user device is compromised and should be denied access to a secured electronic resource or be challenged with supplemental authorization before access to the secured electronic resource is permitted.

As described above, user device 106 may optionally provide session data to authentication decisioning computing system 100 for use in passive-dimension decision process 121. This session data may be used by passive-dimension decision process 121 to perform decisioning service 120 to determine whether to present a supplemental authentication challenge to user device 106. For example, the session data may be compared with identity data 124 to determine whether and how many differences between session data and identity data 124 exist. Received session data may be stored or added to data repository 122 as session data 130, and used to perform historical usage analysis of newly received session data from a user device, to aid in the passive analysis by passive-dimension decision process 121. For example, a magnitude that session data received from user device 106 differs from identity data 124 may be used in evaluating whether to deny a user device access to secured electronic resources or whether to present user device with a supplemental authentication challenge.

Device data 132, for example, may correspond to information useful for or related to determining whether user device is associated with a user. For example, device data 132 may include identifier data 134, which may relate to characteristics of one or a plurality of different user devices 106. In some aspects, identifier data 134 can include information, such as unique identifier information, that can be used on its own to identify a user device 106. Non-limiting examples of such identifier data 134 include a media access control address, a universal device identifier, an android identifier, a serial number, a mobile equipment identifier, an international mobile equipment identity number, etc. In some embodiments, identifier data 132 can include information that can be used in combination with other information to identify a user device 106. Other non-limiting examples of such identifier data 134 include an Internet Protocol address, a browser or device fingerprint. Identifier data 134 may be associated with or cross-referenced to identity data 124 or with one or more user accounts.

Device data 132 may optionally include historical usage information relating to identifier data 134, such as a frequency of access to identifier data 134 by decisioning service 120 for verifying authentication of user devices 106. Such usage information may include times of day for access by user devices 106 to secured electronic resources of client computing systems 104, durations of access to secured electronic resources, or any other information tending to show usage patterns of access to secured electronic resources by a particular user device 106. Such usage patterns may be informative to decisioning service 120 in performing passive-dimension decision process 121 to determine whether to deny access to the secured electronic resource or to permit access to the secured electronic resource, with or without supplemental authentication. As an example, passive-dimension decision process 121 may determine that a user has historically only accessed a particular secured electronic resource using a single user device and that a request for access to the secured electronic resource by a different user device may be denied or may require supplemental authentication before the user device is permitted access to the secured electronic resource.

Device data 132 may optionally include geolocation data 136, which may correspond, for example to geographic information and historical location usage information associated with a user or user device and optionally stored in data repository 122 for historical comparison. For example, geolocation data 136 may include information cross-referencing a particular user, user account, or user device 106 with multiple physical geographical locations and historical usage times associated with the geographical locations. As a specific example, geolocation data 136 may be or include specific latitude and longitude values associated with a user device, which may include a global positioning system sensor or other location sensor. Geolocation data 136 may be obtained or derived from other information about a user device 106, such as an internet protocol address. As another example, geolocation data 136 may also or alternatively relate to geographical location information about an address associated with a user or user account, such as a home address, a work address, or other addresses. Alternatively or additionally, geolocation data 136 may relate to information about how many different locations are or have been associated with a particular user account or user device 106 and a frequency with which the different locations are used to access a secured electronic resource. In some aspects, geographical coordinates associated with a user device may be compared with a historical usage pattern of geographical coordinates associated with a user account. In this way, geolocation data 136 may be useful for providing insights into user behavior and patterns of behavior that may be useful in passive-dimension decision process 121 evaluating whether a particular user account or user device is compromised and should be denied access to a secured electronic resource or be challenged with supplemental authorization before access to the secured electronic resource is permitted.

Device data 132 may optionally include behavioral data 138, which may correspond, for example, information about how a user interacts with a user device 106, and which may be useful for identifying or re-identifying a user. Behavioral data 138 may optionally be used in passive-dimension decision process 121 evaluating whether to deny a user device access to secured electronic resources or whether to present user device with a supplemental authentication challenge. Non-limiting examples of behavioral data 138 include a rate or cadence at which a user types, types of errors and rates of errors made by a user, characteristics relating to mouse, pointer, or other graphical input usage, such as scrolling behavior, selection or click behavior, movement styles or patterns, or swipe behavior or patterns. Other non-limiting examples of behavioral data include HTTP referer information. Behavioral data 138 may be stored in data repository 122 for historical comparison upon future attempts to access a secured electronic resource by a user device 106. For example, received or identified behavioral data 138 may be stored or added to data repository 122, and used to perform historical usage analysis of newly received behavioral data from a user device by comparison, to aid in the passive analysis by passive-dimension decision process 121. For example, a magnitude that behavioral data received from user device 106 differs from behavioral data 138 may be used in evaluating whether to deny a user device access to secured electronic resources or whether to present user device with a supplemental authentication challenge.

The above described identity data 124 and device data 132 may optionally be used alone or in any combinations by passive-dimension decision process 121 for verifying authentication of user devices 106 and determination of whether to deny access to a secured electronic resource or to permit access to the secured electronic resource, with or without supplemental authentication. For example, any one or more of user profile data 126, repository data 128, session data 130, identifier data 134, geolocation data 136, or behavioral data 138 may be analyzed, such as in one or more comparisons, for verifying authentication of a user device 106. In some aspects, passive-dimension decision process 121 may employ individual scoring of each type of identity data 124 and device data 132 and use a combined score to determine whether to allow access, deny access, or challenge with supplemental authentication. Alternatively, passive-dimension decision process 121 may employ combined scoring of multiple types of identity data 124 and device data 132 to determine whether to allow access, deny access, or challenge with supplemental authentication. Optionally, passive-dimension decision process 121 may apply individual weights to any and all scores for determining whether to allow access, deny access, or challenge with supplemental authentication. In some aspects, such weights may be changed dynamically and on-the-fly in response to needs of a particular client computing system 104. Optionally, the weights or variables used to determine weights may be received by verification server 118, such as from client computing system 104, and used by passive-dimension decision model in authentication verification. In this way, passive-dimension decision process 121 can be dynamically updated in order to increase or decrease the rates at which user devices 106 are being allowed or denied access to secured electronic resources or are being challenged with supplemental authentication before access to secured electronic resources is granted. Weighting may be useful, in some embodiments, to prevent certain characteristics from being used in a passive-dimension decision model (e.g., where a weight is set to null, zero, or another value representing non-use of a particular characteristic).

Use of weights may also be advantageous for allowing specialized users access to secured electronic resources. For example, in some contexts, a user device attempting to access a secured electronic resource may be an internal user, such as a customer service agent, for which device characteristics may be different from a normal end-user. Such a situation may occur where an authorized user is requesting assistance from a customer service agent to obtain information about a user account and the customer service agent is accessing the secured electronic resource on behalf of or in place of the user, so the passive dimension analysis for customer service agent may therefore occur differently.

In some aspects, the authentication decisioning computing system 100 can implement one or more procedures to secure communications between the authentication decisioning computing system 100 and other systems. Non-limiting examples of features provided to protect data and transmissions between the authentication decisioning computing system 100 and other systems include secure web pages, encryption, firewall protection, network behavior analysis, intrusion detection, etc. In some aspects, transmissions with client computing systems 104, contributor computing systems 102, or user devices 106 can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Examples of Authentication Verification Operations

The authentication decisioning computing system 100 can execute one or more processes that transmit, to client computing systems 104 and in real-time, authentication verification decisions, other indicators of whether to allow or deny a user device 106 access to secured electronic resources, or indicators of whether to require supplemental authentication before access to secured electronic resources is authorized. For instance, client computing systems 104 may be operated by a business, entity, or service provider that provides access to a secured electronic resource to user devices 106. Primary user authentication credentials, such as username and password, access cookies, security tokens, and the like may be compromised and used to gain unauthorized or illicit access to secured electronic resources. Authentication decisioning computing system 100 may allow for further protection of access to the secured electronic resources without being burdensome on authentically authorized users. For example, an online service providing access to a secured electronic resources, which is hosted by a client computing system 104, can be accessed by a consumer computing system 106, where communications from the consumer computing system 106 appear to come from an authorized user (e.g., a user who uses valid primary authentication credentials). The authentication decisioning computing system 100 may prevent an unauthorized user of valid primary authentication credentials from accessing the secured electronic resource (e.g., by denying access upon passive analysis by passive-dimension decision model or requiring supplemental authorization, which an unauthorized user may not be able to pass), while still allowing authorized users of valid primary authentication credentials access to the secured electronic resource (e.g., by optionally challenging or not challenging the authorized user with supplemental authorization). Such a configuration advantageously streamlines the process of accessing the secured electronic resource for authorized users by not always requiring supplemental authorization for each and every access attempt. If passive-dimension decision process 121 determines that a user may not be authorized, that an impostor is using primary authentication credentials, or that an authorized user may be attempting to access the secured electronic resource in a way not normally used, access may be denied or supplemental authentication may be required before access is granted.

Figure 2:
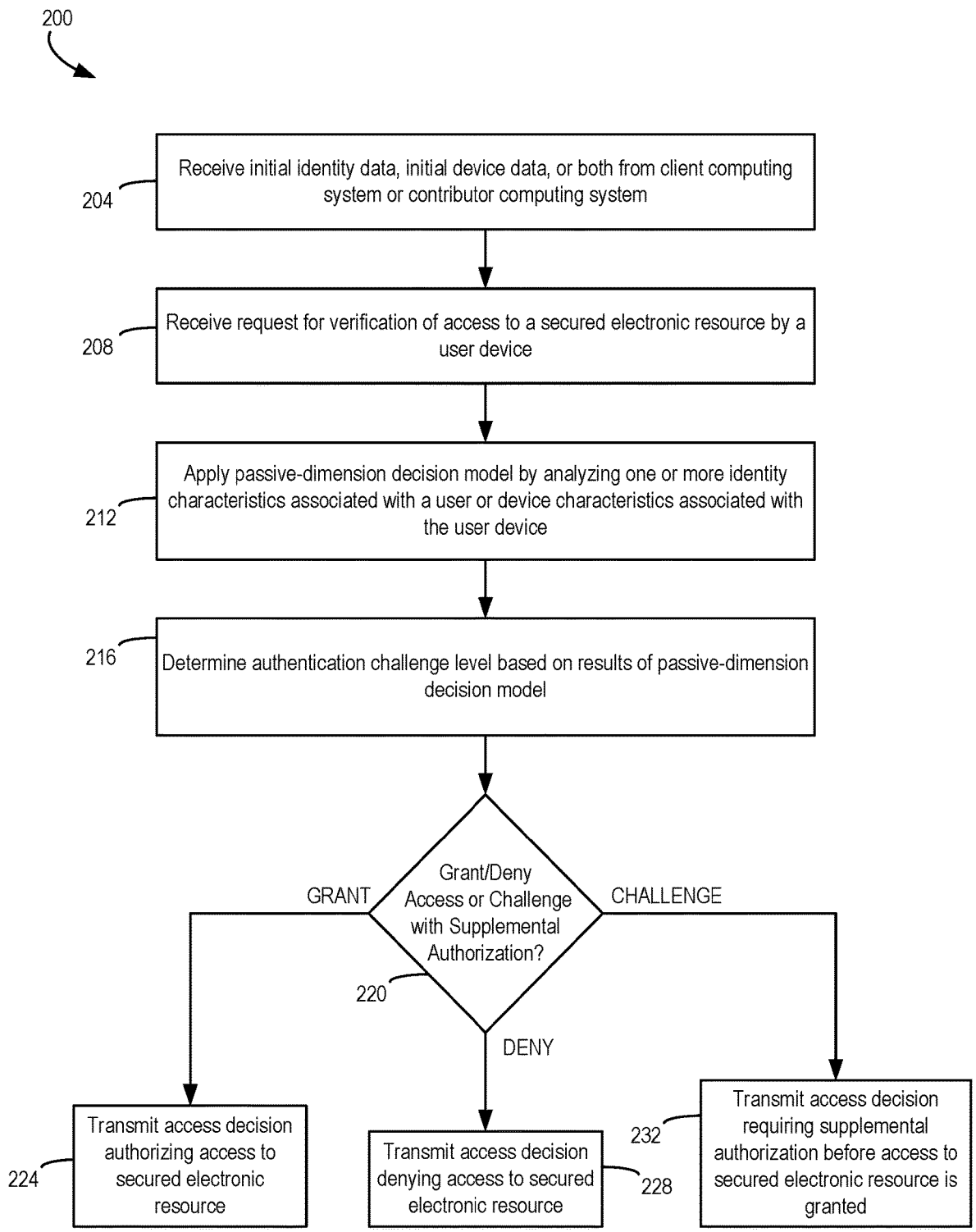
FIG. 2 is a flow chart illustrating an example of a process for verifying authorization to access a secured electronic resource, according to an aspect of the present disclosure.

FIG. 2 is a flow chart illustrating an example of a process 200 for verifying authorization to a secured electronic resource. For illustrative purposes, the process 200 is described with reference to implementations described above with respect to one or more examples described herein. Other implementations, however, are possible. In some aspects, the steps in FIG. 2 may be implemented in program code that is executed by one or more computing devices such as the verification server 118 depicted in FIG. 1. In some aspects of the present disclosure, one or more operations shown in FIG. 2 may be omitted or performed in a different order. Similarly, additional operations not shown in FIG. 2 may be performed.

At block 204, process 200 involves receiving initial identity data or device data from a client computing system or a contributor computing system. For example, initial identity data may correspond to user account or profile data for an authorized user and may contain confirmed identity information data for use in comparison with later received session data as part of a passive-dimension decision model analysis. As another example, initial device data may correspond to a list of authorized devices or characteristics about devices that may be authorized. This initial data may optionally be stored to a database or other transitory or non-transitory data storage device. It will be appreciated that, although block 204 is illustrated in FIG. 2 as occurring before other aspects of process 200, the process represented by block 204 may occur after other blocks or simultaneous with other blocks. In some embodiments, block 204 may be optional and may not occur at all. For example, upon initial creation of a user account and profile, initial data may be provided by a user, who may be prompted for supplemental authorization to prove their identity and access to a particular secured electronic resource.

At block 208, process 200 involves receiving a request for access or verification of access to a secured electronic resource by a user device, such as at an authentication decisioning computing system. Such a request may be received from a client computing system, for example, which generates the request upon a user device attempting to access the secured electronic resource. The request for verification of access may be generated in response to verifying primary authorization credentials for accessing the secured electronic resource. For example, a client computing system may receive a username and password, access token, etc. from a user device and then generate the request for verification upon confirming that the username and password, access token, etc., are valid and permit access to the secured electronic resource. Optionally, the request for verification may be received from a user device. For example, upon verifying primary authorization credentials, a client computing system may provide or otherwise facilitate generation of a preliminary authorization token to a user device and the user device may transmit the preliminary authorization token to an authentication decisioning computing system as a request for verifying access to the secured electronic resource. The request for verification may include session data associated with a user requesting access to a secured electronic resource, such as input provided by a user that is responsive to one or more queries presented by a user device. In some aspects, the request for verification may optionally include one or more of identity data or device data that may be used to verify access to the secured electronic resources.

At block 212, process 200 involves applying a passive-dimension decision model, such as to the user, the user device, the request for access, or some combination thereof. The passive-dimension decision model may, for example, comprise analyzing identity characteristics associated with the user device or the request for access and be part of or used in determining an authentication challenge level. Alternatively or additionally, the passive-dimension decision model may comprise analyzing device characteristics associated with the user device or the request for access and determining an authentication challenge level. In some aspects, the passive-dimension decision model may be performed passively, i.e., without further interaction from the user or user device, but may utilize session data provided as part of the request for verification.

As described above, examples of identity characteristics include an identity of a user (e.g., legal name), an identifier associated with a user (e.g., username, social security number, or email address), and historical usage information relating to the identity or identifiers. Examples of device characteristics include a device identifier associated with the user device (e.g., IP address or serial number), a location profile associated with the user or user device (e.g., geolocation data), an interaction profile associated with the user or user device (e.g., characteristics relating to how a user requests access to the secured electronic resource), and historical usage information relating to one or more of the device identifier, the location profile, and the interaction profile.

As an example of a passive-dimension decision model, input session data associated with the request may be obtained and compared with previously obtained reference data. Previously obtained reference data may correspond to previously obtained input session data, for example. Optionally, characteristics of the input session data that match the previously obtained reference data may be determined, characteristics of the input session data that differ from the previously obtained reference data may be determined, or both. Accordingly, in some aspects, session data can be compared to previous session data previously obtained for requests to access a secured electronic resource in order to determine whether the session data matches previous session data or matches expected session data. As an example, expected session data may correspond to or represent a change to previous session data that is derived by analyzing trends in previous session data. Since session data associated with the request may be representative of the most current data at the time of verifying authentication, differences in comparison and matching of the session data with prior session data may be attributable to variances in time.

As another example of a passive-dimension decision model, a user identity may be determined, such as by obtaining a name of a user from input session data or from previously obtained reference data. Optionally, a database listing user identities may be queried for the user identity to determine the identity whether the user identity represents an actual user. In some aspects, exact and inexact identity determinations may be utilized, such as to account for name changes, nicknames, maiden names. Optionally, authentication challenge level determinations may evaluate whether an identity corresponds to an exact match or an inexact match or whether the identity is not verified and this evaluation can be used to determine whether or not to allow access to a secured electronic resource or whether or not to require supplemental authentication.

As another example of a passive-dimension decision model, a user identifier may be determined, such as by from input session data or from previously obtained reference data. Example user identifiers include username, an email address, a social security number, etc. In an aspect, user identifiers may be used to confirm or validate a user's identity, optionally in combination with other characteristics, and may be used as a basis for an authentication challenge level determination. Optionally, a historical usage database is queried to determine a usage frequency of the user identifier, such as to determine whether the user identifier is used or appears in association with any other user accounts or to determine usage patterns of the user identifier. In some aspects, pattern identification may be useful for evaluating user identifiers in a passive-dimension decision model and allow for improved prediction of whether an access attempt is authorized or unauthorized. For example, comparing patterns of proven or authenticated use of a user identifier over time may allow usage anomalies to be identified and unauthenticated use to be determined. In some aspects, a single user identifier falling outside of an identified usage pattern may or may not, in and of itself, result in an authentication challenge level indicating unauthorized access, and so the authentication challenge level determination may use user identifier evaluation in combination with other characteristics.

As another example of a passive-dimension decision model, a device identifier may be determined, such as by from input session data. Example device identifiers include internet protocol (IP) address, a media access control (MAC address), a device serial number, a subscriber identity module number (physical or digital), a network or cellular service provider name or identifier, etc. As another example of a device identifier, a device fingerprint that can distinguish between different devices may be used. A device fingerprint may optionally be determined by evaluating characteristics of the device (software environment, network environment, hardware configuration) or by evaluating input usage characteristics (touchpad usage, text entry patterns, gyroscopic or accelerometer data, etc.). Optionally, a device database is queried to determine a usage frequency of the device identifier, such as to determine whether the device identifier is used appears in association with any other user accounts. For example, although many devices, such as smartphones, laptops, and tablets, may be used or owned by a single user, some devices may be shared between users and some devices may be more public in nature (e.g., public kiosk, library computers, workstations, etc.) and used by more than one user. In addition, individual users may use a number different devices. In some aspects, devices used by multiple different users can be identified as such by tracking device identifiers associated with different user accounts. Similarly, in some aspects, multiple devices used by a single user can be identified as such or associated with the user's access history. These aspects may be incorporated into the usage pattern evaluation to determine whether an access request falls outside of normal usage behavior for a user. For example, a frequency at which a user makes use of shared devices or a frequency at which the user shares their device (or a device primarily associated with the user) with other users may be evaluated as part of a passive-dimension decision model. In addition, as described below, inputs provided to the devices (keystrokes, mouse or other graphical inputs, etc.) can be used to identify a particular user across different devices, such as by determining an interaction profile or other user fingerprint, for example, from input session data.

As another example of a passive-dimension decision model, geolocation information for a user device may be determined, such as included in input session data or otherwise received from a user device. A location profile may be generated using geolocation data and compared with previous location profile data to determine aspects of the location profile match entries in a location database. For example, location profile data may include one or more of a real-time physical location or geographical coordinate associated with the user device. Optionally, a geographical coordinate may be obtained by a position sensor of user device or a geographical coordinate associated with the user device may be determined by querying a geolocation database with a device identifier associated with the user device. In some aspects, location may be derived from any element or attribute that can be connected to a location or can be determined at a location, such as an area code, a global positioning system (GPS) signal, a data connectivity signal (wireless, cellular, or hard-line), cell-tower triangulation, an assisted GPS signal, an internet protocol address or address prefix, etc. In some aspects, certain identifiers may be associated with particular locations that may be different from an actual geographical location of a user. Such location information is optionally still useful for inclusion in a location profile, such as to establish patterns of locations associated with a user for later comparison. For example, an area code of a telephone number may have a location associated with it (even though number porting is pervasive and mobile phones may be transported to geographies remote from the location associated with their area codes), and this location may be associated with the user or included in a location profile associated with a user. Optionally, aspects of the location profile may be verified against a location database to verify whether the user or user device is associated with or represented by a particular location or whether the location profile falls outside of or within location patterns associated with the user. As a specific example, if a historical location profile associated with a user identifies activity as typically occurring within 50 miles of a user's home or work address, an access request that is associated with a location that 500 miles away may result in a different authentication challenge level than may result from an access request that is associated with a location that is 1 mile away from a user's home address. A passive-dimension decision model may use not only the location information for pattern evaluation, but may also use time of day, dates, days of the week, device characteristics, etc. in determining that an access requests that fall outside of normal location behavior patterns and may be unauthorized.

As another example of a passive-dimension decision model, a user interaction profile may be determined, such as by from input session data. A user interaction profile may identify one or more of an input characteristic associated with the user providing input to the user device or using, holding, or otherwise interacting with a user device. In another aspect, user interaction profiles may also include or relate new information about a user, user account, or device. For example, a new name or name not previously associated with any address or any user, or a new phone number not previously associated with any address, etc., may represent a new user or user attempting to access a secured electronic resource for the first time. In an aspect, a user accessing a secured electronic resource for the first time may result in creation of a user interaction profile, which may be useful for future comparisons. Optionally, a user interaction profile may be determined by or include information relating to tracking keystrokes input by a user, tracking mouse or, touch sensitive inputs (touchscreen, touchpad) or other graphical input device movements provided by the user, using accelerometer or gyroscopic data from a user device, using location information (e.g., GPS coordinates or sequences of GPS coordinates) from a user device. In some aspects, a user interaction profile may represent a user fingerprint or user signature describing how a user interacts with or uses a device, and may allow for identification or re-identification of a user that is using a new device or another device not yet or not normally associated with the user. As examples, characteristics may be identified about user device usage (e.g., holding in hands versus positioned on a table, user handedness, skill and preference of mouse/touchpad/trackball/pointing stick, typing ability and cadence). As more inputs or interactions with user devices are provided by a user, a historical user interaction profile may be developed, allowing more robust comparison and evaluations to be performed over time. Optionally, a user interaction profile is compared with previously obtained user interaction profile data to identify aspects which match or differ. As a specific example, an interaction profile may contain or relate to handedness information about a user (e.g., identifying which hand a user uses to interact with a device); if such handedness information changes for a particular access request (as compared to historical interaction profile information), the passive-dimension decision model may generate an authentication challenge level that is different from what would otherwise be generated if the handedness information matches that in the historical interaction profile information, potentially indicating that the access attempt is or should be unauthorized. In some aspects, such a change may not actually be associated with an unauthorized access attempt, such as if a user were to injure a hand and shift to interacting with a device using their other hand; in this aspect, combination of location profile analysis and other characteristics by the passive-dimension decision model may still result in the access attempt being verified as authorized.

At block 216, an authentication challenge level for the request may be generated based on results of the passive dimension decision model. For example, the authentication challenge level may indicate whether a user should be permitted access to the secured electronic resource, should be denied access to the secured electronic resource, or should be challenged with a supplemental authorization step before access to the secured electronic resource. Successfully passing the supplemental authorization step can result in access being permitted. Failing the supplemental authorization step can result in access being denied. The authentication challenge level may optionally be generated as a raw value for communication to a client computing system or user device or may be generated as a processed access decision that indicated whether access is denied or granted, for example.

At block 220, process 200 can branch, depending on whether access is to be granted, denied, or whether supplemental authorization is needed. If access is to be granted, process 200 branches to block 224, where an access decision authorizing access to the secured electronic resources is generated and optionally transmitted. If access is to be denied, process 200 branches to block 228, where an access decision denying access to the secured electronic resources is generated and optionally transmitted. If a supplemental authentication challenge is to be presented to the user, process 200 branches to block 232, where an access decision requiring supplemental authentication generated and optionally transmitted.

If supplemental authentication is required, a variety of different supplemental authentication techniques may be employed. For example, a multi-factor authentication query technique may be used, such as where a one-time access token is prompted for, which may be received, for example, by text message, by email, by telephone, by physical mail, or by token generator. As another example, knowledge-based authentication query techniques may be employed, such as where a user is prompted to provide information that is only known to the user. As another, device push notifications, biometric matching techniques (e.g., fingerprint, facial recognition, voice recognition, etc.), provision of an identity card or other key-object scan or image, or provision of a digital keyfile may be employed for supplemental authentication or as a multi-factor authentication query. Combinations of any these example may also be employed for supplemental authentication.

Figure 3:
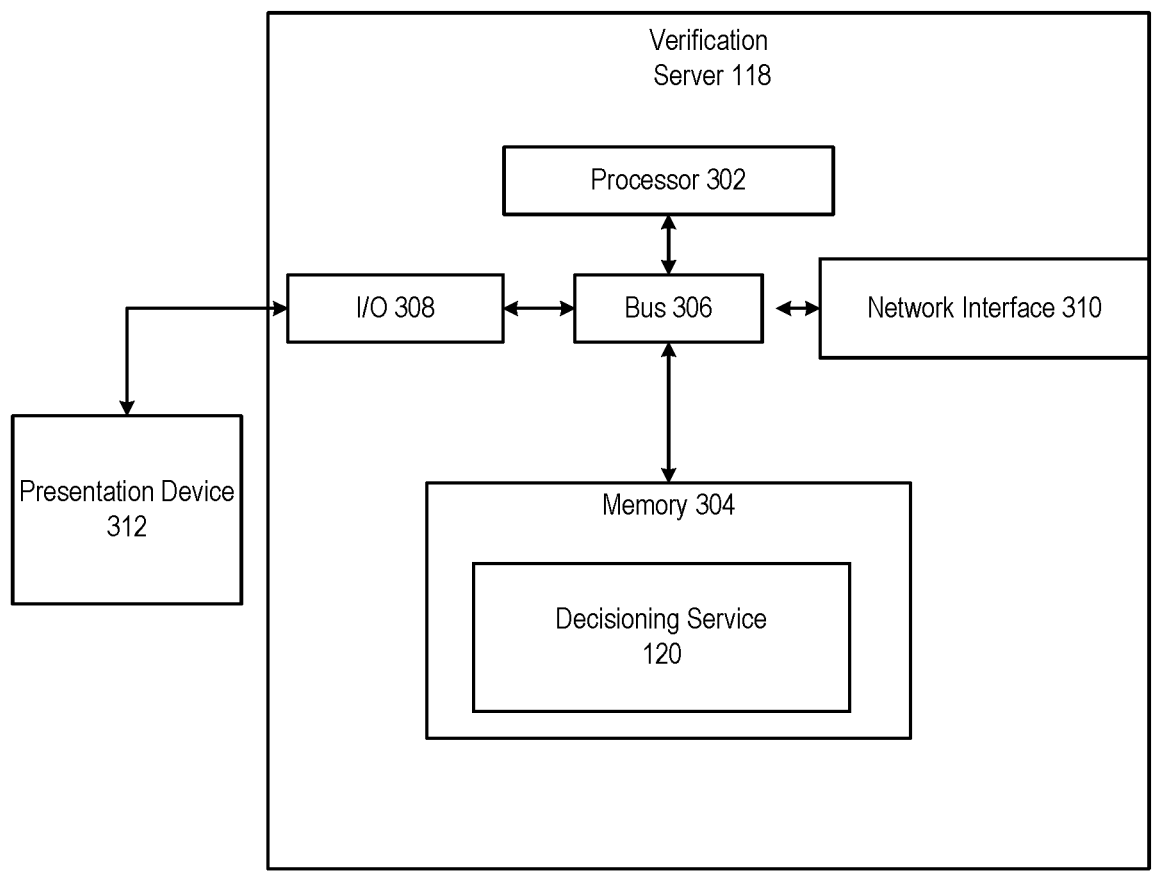
FIG. 3 is a block diagram depicting an example of a verification server included in, or configured to communication with, an authentication decisioning computing system, according to an aspect of the present disclosure.

Computing Environment Example for Automated Authentication Verification and Decisioning Any suitable computing system or group of computing systems can be used to perform the operations for authentication verification and decisioning described herein. For example, FIG. 3 is a block diagram depicting an example of a verification server 118. The example of the verification server 118 can include various devices for communicating with other devices in the authentication decisioning computing system 100, as described with respect to FIG. 1. The verification server 118 can include various devices for performing one or more verification and decisioning operations described above with respect to FIGS. 1-2.

The verification server 118 can include a processor 302 that is communicatively coupled to a memory 304. The processor 302 executes computer-executable program code stored in the memory 304, accesses information stored in the memory 304, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 302 include a microprocessor, an application-specific integrated circuit, a field-programmable gate array, or any other suitable processing device. The processor 302 can include any number of processing devices, including one. The processor 302 can include or communicate with a memory 304. The memory 304 stores program code that, when executed by the processor 302, causes the processor to perform the operations described in this disclosure.

The memory 304 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The verification server 118 may also include a number of external or internal devices such as input or output devices. For example, the verification server 118 is shown with an input/output interface 308 that can receive input from input devices or provide output to output devices. A bus 306 can also be included in the verification server 118. The bus 306 can communicatively couple one or more components of the verification server 118.

The verification server 118 can execute program code that includes the decisioning service 120. The program code for the decisioning service 120 may be resident in any suitable computer-readable medium and may be executed on any suitable processing device. For example, as depicted in FIG. 3, the program code for the decisioning service 120 can reside in the memory 304 at the verification server 118. Executing the decisioning service 120 can configure the processor 302 to perform the operations described herein.

In some aspects, the verification server 118 can include one or more output devices. One example of an output device is the network interface device 310 depicted in FIG. 3. A network interface device 310 can include any device or group of devices suitable for establishing a wired or wireless data connection to one or more data networks described herein. Non-limiting examples of the network interface device 310 include an Ethernet network adapter, a modem, etc.

Another example of an output device is the presentation device 312 depicted in FIG. 3. A presentation device 312 can include any device or group of devices suitable for providing visual, auditory, or other suitable sensory output. Non-limiting examples of the presentation device 312 include a touchscreen, a monitor, a speaker, a separate mobile computing device, etc. In some aspects, the presentation device 312 can include a remote client-computing device that communicates with the verification server 118 using one or more data networks described herein. In other aspects, the presentation device 312 can be omitted.

Other devices described herein, such as contributor computing systems 102, client computing systems 104, and user devices 106 may include the same or different components as depicted in FIG. 3.

GENERAL CONSIDERATIONS

Numerous specific details are set forth herein to provide a thorough understanding of the disclosure. Those skilled in the art will understand that the claimed subject matter may be practiced without these specific details. In other instances, features that would be known by one of ordinary skill have not been described in detail so as not to obscure claimed subject matter.

Unless specifically stated otherwise, throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "configured to" herein is meant as open and inclusive language that does not foreclose devices configured to perform additional tasks or steps. The use of "based on" is meant to be open and inclusive, in that an action "based on" one or more recited conditions or values may, in practice, be based on additional conditions or values beyond those recited. Headings, lists, and numbering included herein are for ease of explanation only and are not meant to be limiting.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable language or combinations of languages may be used to implement this disclosure in software to be used in programming or configuring a computing device.

Aspects disclosed herein may be performed in the operation of such computing devices. The order of the blocks presented in the examples above can be varied—for example, blocks can be re-ordered, combined, broken into sub-blocks, or performed in parallel. While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
receiving, at an authentication decisioning computing device and from a user device, a request for verification of access, by the user device, to a secured electronic resource provided by an additional computing device, the request comprising: a) input session data describing a session of the user device;
determining, via a passive-dimension decision model included in the authentication decisioning computing device, an authentication challenge level for the user device for access to the secured electronic resource, wherein determining the authentication challenge level comprises applying the passive-dimension decision model to the request by:
modifying the passive-dimension decision model based on one or more weights, the one or more weights received from the additional computing device that provides the secured electronic resource for which the verification of access is requested,
analyzing one or more of (a) identity characteristics associated with the user device or the request, or (b) device characteristics associated with the user device or the request,
comparing the input session data from the request with previously obtained reference data, and
determining, based on the comparison of the input session data and the previously obtained reference data, whether the identity characteristics or the device characteristics are outside a norm for the user device;
and
communicating an access decision to one or more of the user device or the additional computing device, wherein the access decision is determined from a set of access decisions including at least:
authorizing access to the secured electronic resource by the user device without supplemental authentication,
denying access to the secured electronic resource by the user device, and
presenting a supplemental authentication challenge to the user device.

2. The method of claim 1, wherein the request for verification of access to the secured electronic resource corresponds to a query requesting whether to challenge the user device with the supplemental authentication prior to granting access to the secured electronic resource.

3. The method of claim 1, wherein the request is received after the user device obtains primary authorization credentials authorizing the user device to access the secured electronic resource.

4. The method of claim 1, wherein determining the authentication challenge level includes applying the passive-dimension decision model that analyzes one or more of the identity characteristics or the device characteristics without receiving input from the user device during determining the authentication challenge level.

5. The method of claim 1, wherein applying the passive-dimension decision model comprises one or more of:
obtaining the input session data associated with the request from the user device and comparing the input session data with the previously obtained reference data;
determining a user identity corresponding to the user device and searching an identity database using the user identity;
determining an identifier associated with a user of the user device and searching a historical usage database using the identifier;
determining a device identifier associated with the user device and searching a device database using the device identifier;
determining a location profile associated with the user or the user device and searching a location database using the location profile; or
determining a user interaction profile associated with the request for access to the secured electronic resource and comparing the user interaction profile with previously obtained user interaction profile data.

6. The method of claim 5, wherein the input session data corresponds to data input responsive to one or more informational queries presented by the user device.

7. The method of claim 5, wherein determining the authentication challenge level includes using a result of comparing the input session data with the previously obtained reference data by determining aspects of the input session data that match the previously obtained reference data, and determining additional aspects of the input session data that differ from the previously obtained reference data.

8. The method of claim 5, wherein determining the authentication challenge level includes one or more of:
verifying whether the user identity appears in the historical usage database in association with the user or other users,
verifying whether the device identifier appears in the device database in association with the user or with other users,
verifying whether aspects of the location profile match entries in the location database associated with the user or the user device, or
verifying whether aspects of the user interaction profile match or differ from the previously obtained user interaction profile data.

9. The method of claim 5, wherein determining the location profile includes one or more of: receiving a geographical coordinate obtained by a position sensor of the user device, determining a geographical coordinate associated with the user device by querying a geolocation database with the device identifier associated with the user device, or determining a historical usage pattern of geographical coordinates associated with the user device.

10. The method of claim 5, wherein determining the user interaction profile includes one or more of tracking keystrokes input by the user or tracking mouse movements input by the user.

11. The method of claim 1, wherein analyzing the identity characteristics includes one or more of:
obtaining the input session data associated with the request from the user device and comparing the input session data with the previously obtained reference data;
determining a user identity associated with a user and searching an identity database using the user identity; or
determining an identifier associated with the user and searching a historical usage database using the identifier.

12. The method of claim 1, wherein presenting the supplemental authentication challenge to the user device includes one or more of:
presenting a multi-factor authentication query at the user device; or presenting a knowledge-based authentication query at the user device.

13. An authentication decisioning system comprising:
a processing device;
a non-transitory computer-readable medium included in or communicatively coupled to the processing device, the non-transitory computer-readable medium storing a data structure for storing user data records and instructions that are executable by the processing device to cause the authentication decisioning system to:
  receive, at the authentication decisioning system and from a user device, a request for verification of access, by the user device, to a secured electronic resource provided by an additional computing system, the request comprising: a) input session data describing a session of the user device;
  determine, via a passive-dimension decision model included in the authentication decisioning system, an authentication challenge level for the user device for access to the secured electronic resource, wherein determining the authentication challenge level comprises applying the passive-dimension decision model to the request by:
    modifying the passive-dimension decision model based on one or more weights, the one or more weights received from the additional computing device that provides the secured electronic resource for which the verification of access is requested,
    analyzing one or more of (a) identity characteristics associated with the user device or the request, or (b) device characteristics associated with the user device or the request,
    comparing the input session data from the request with previously obtained reference data, and
    determining, based on the comparison of the input session data and the previously obtained reference data, whether the identity characteristics or the device characteristics are outside a norm for the user device; and
  communicate an access decision to one or more of the user device or the additional computing system, wherein the access decision is determined from a set of access decisions including at least:
    authorizing access to the secured electronic resource by the user device without supplemental authentication,
    denying access to the secured electronic resource by the user device, and
    presenting a supplemental authentication challenge to the user device.

14. The system of claim 13, wherein the request for verification of access to the secured electronic resource corresponds to a query requesting whether to challenge the user device with the supplemental authentication prior to granting access to the secured electronic resource.

15. The system of claim 13, wherein the request is received after the user device obtains primary authorization credentials authorizing the user device to access the secured electronic resource.

16. The system of claim 13, wherein applying the passive-dimension decision model comprises one or more of:

obtaining the input session data associated with the request from the user device and comparing the input session data with the previously obtained reference data;
determining a user identity corresponding to the user device and searching an identity database using the user identity;
determining an identifier associated with a user of the user device and searching a historical usage database using the identifier;
determining a device identifier associated with the user device and searching a device database using the device identifier;
determining a location profile associated with the user or the user device and searching a location database using the location profile; or
determining a user interaction profile associated with the request for access to the secured electronic resource and comparing the user interaction profile with previously obtained user interaction profile data.

17. The system of claim 16, wherein determining the authentication challenge level includes using a result of comparing the input session data with the previously obtained reference data by determining aspects of the input session data that match the previously obtained reference data, and determining additional aspects of the input session data that differ from the previously obtained reference data.

18. The system of claim 16, wherein determining the authentication challenge level includes one or more of:
verifying whether the user identity appears in the historical usage database in association with the user or other users,
verifying whether the device identifier appears in the device database in association with the user or with other users,
verifying whether aspects of the location profile match entries in the location database associated with the user or the user device, or
verifying whether aspects of the user interaction profile match or differ from the previously obtained user interaction profile data.

19. The system of claim 13, wherein analyzing the identity characteristics includes one or more of:
obtaining the input session data associated with the request from the user device and comparing the input session data with the previously obtained reference data;
determining a user identity associated with a user and searching an identity database using the user identity; or
determining an identifier associated with the user and searching a historical usage database using the identifier.

20. The system of claim 13, wherein presenting the supplemental authentication challenge to the user device includes one or more of:
presenting a multi-factor authentication query at the user device; or
presenting a knowledge-based authentication query at the user device.

* * * * *